United States Patent [19]

Thalmann

[11] Patent Number: 5,509,706
[45] Date of Patent: Apr. 23, 1996

[54] PAVING STONE, BRICK AND TILE TOOL

[76] Inventor: Hans J. Thalmann, 355 Glenwood Rd., Ridgewood, N.J. 07450

[21] Appl. No.: 403,399
[22] Filed: Mar. 14, 1995
[51] Int. Cl.$^6$ ..................................... B65G 7/12
[52] U.S. Cl. ............................... 294/62; 294/16
[58] Field of Search ........................ 294/16, 28, 50.9, 294/62, 63.1, 104

[56] References Cited

U.S. PATENT DOCUMENTS

| 705,277 | 7/1902 | McDowell | 294/62 |
| 806,197 | 12/1905 | Schulz | 294/62 |
| 1,153,269 | 9/1915 | Sturm, Sr. | 294/62 |
| 1,586,475 | 5/1926 | Schondelmayer et al. | 294/62 |
| 2,578,072 | 12/1951 | Kargol | 294/62 |
| 3,061,350 | 10/1962 | Miller | 294/16 |

FOREIGN PATENT DOCUMENTS

| 43926 | 3/1931 | Denmark | 294/62 |
| 1106704 | 12/1955 | France | 294/62 |
| 2610791 | 9/1977 | Germany | 294/62 |
| 516881 | 2/1955 | Italy | 294/62 |

Primary Examiner—Dean Kramer
Attorney, Agent, or Firm—Terrance L. Siemens

[57] ABSTRACT

A hand tool for removing/replacing individual paving stones, bricks, tiles and the like includes a relatively stationary upper handle affixed to a depending rear jaw having a lower grasping end and which cooperates with a similar, opposed jaw as affixed to a lower, displaceable handle. These two main components are connected through a transverse pivot fastener joining the free distal end of the upper handle to the forward end of the lower handle, adjacent its fixation to the front jaw. With the upper handle formed with a cross-section of that of an inverted U-channel and the lower handle defining a U-channel in cross-section, the former is sandwiched within the latter to provide a comfortable, positive grip as a user places a palm over the upper handle with the thumb and forefinger straddling same while the finger tips engage the displaceable lower handle to manipulate it and its attached front jaw to vary the spacing between the two jaws and the clamping action therebetween as a block or the like is engaged by the lower jaw tips. To most positively engage blocks of varying configurations, the jaw lower tips may be alternately configured to provide straight, curved, or pairs of angularly offset portions.

4 Claims, 3 Drawing Sheets

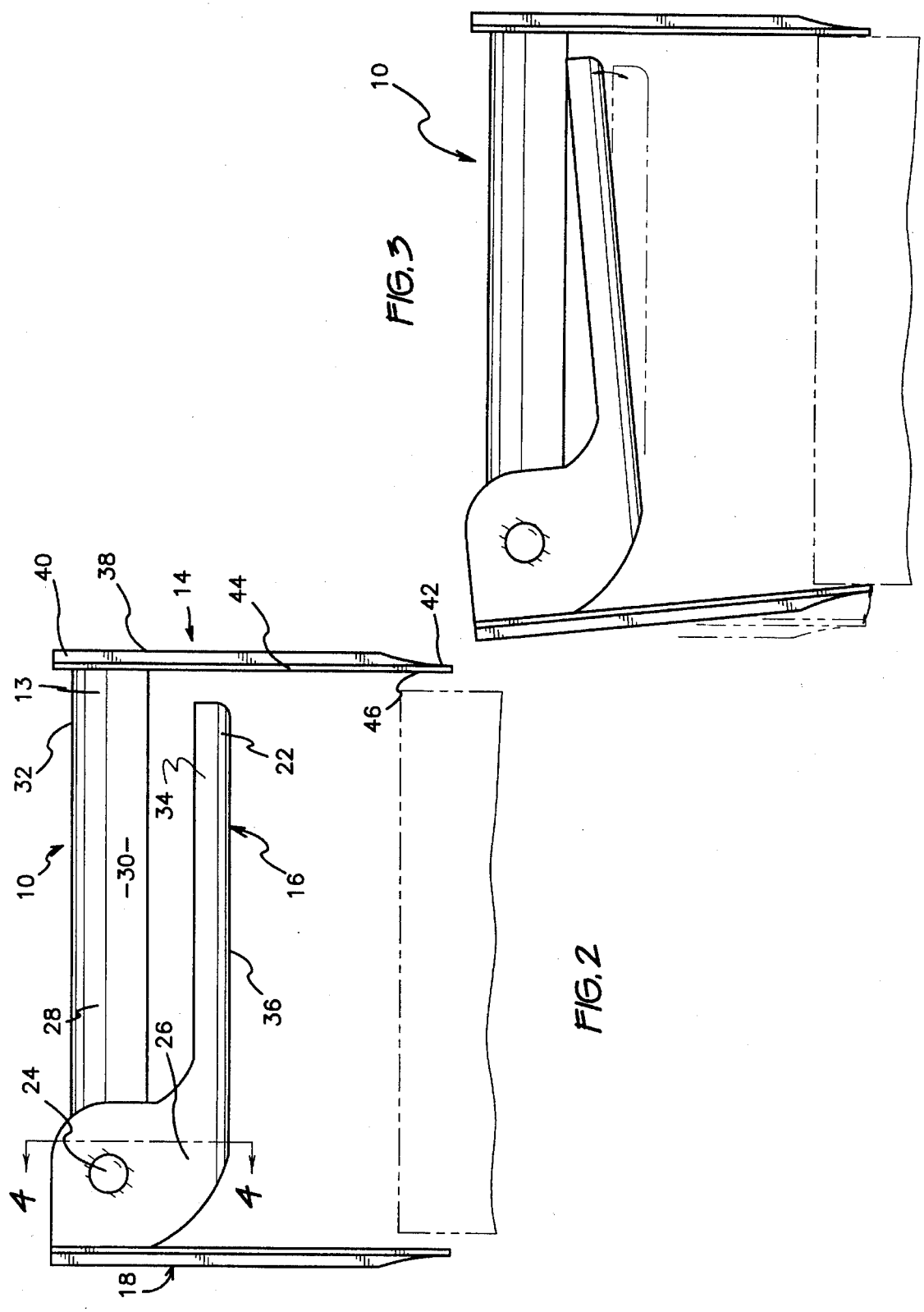

PAVING STONE, BRICK AND TILE TOOL

BACKGROUND OF THE INVENTION

1. Field of the Invention

This invention relates generally to a handling device and more particularly, to an improved hand operated tool particularly adapted to facilitate the removal and/or the installation of stone, brick, tile or the like.

Ornamental block elements, either cast or quarried, are a popular item employed in the construction of walkways, patios, garden borders and other areas serving either as functional pathways or decorative features around homes, gardens, or office buildings. Such block elements may comprise bricks, paving stones, tiles, or other block members and are available in a myriad of configurations such as square, rectangular, circular or polygonal. When such elements are installed for but ornamental purposes or foot traffic, they are frequently deposited upon a firm bed with sand filling the joints between adjacent elements. Alternately, a settable binding composition such as mortar may be used in the joints.

Regardless of the material of the block or tile elements or the type of joint composition, one or more of the elements in any installation frequently becomes chipped, cracked or otherwise broken or disfigured and requires replacement. The tool of the present invention has been devised to facilitate the ready removal of such damaged elements as well as providing a convenient manner for installing a replacement block or tile element. With a one-handed manipulation of the present tool, individual elements are quickly and simply lifted from their former placement without disturbance of the adjacent elements, with the same tool being utilized to lower into position a suitable replacement element. To achieve the foregoing accomplishment without disrupting any of the adjacent block elements or inflicting further damage to the block being handled, calls for a tool permitting positive, independent control over both the lifting as well as the clamping forces of the tool. Thus it can be seen that the potential fields of use for this invention are myriad and the particular preferred embodiments described herein are in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of the previously unknown general purpose article of manufacture. It is to be understood from the outset that the scope of this invention is not limited to these fields or to the specific examples of potential uses presented hereinafter.

2. Description of the Related Art

Hand manipulated tool devices for lifting and lowering block elements are broadly known in the art as exemplified in the following described patents but which fail to suggest the simplicity and effectiveness of the present invention.

U.S. Pat. No. 1,533,934 issued to Lutz on Apr. 14, 1925 is directed to a lifting implement particularly constructed to enable the handling of oversize bricks and includes three or four jaw members since a requirement of this tool is to enable a tilting of the lifted brick. This is possible in view of the use of more than one jaw engaging at least one end of the brick and wherein the jaws are closed upon raising of the transversely extending handle. The present tool utilizes single plate-like jaws providing a wide expanse of clamping area at each end of the engaged element rather than the point contact offered by the Lutz tool jaws and also presents a dual handle mechanism permitting independent control of both the clamping force and lifting force, features not apparent in this prior art tool.

Another brick carrier device will be found in U.S. Pat No. 1,586,475 issued May 25, 1926 to Schondelmayer et al. and which illustrates a mechanism allowing of altering the spacing between a pair of jaws in order to accommodate the varying dimensions of alternate brick loads. Again, a single uppermost pivoted handle is shown and this very construction precludes the precise independent control over the clamping and lifting forces as offered by the tool of the present invention.

A fixed, top handle brick manipulating tool is shown in U.S. Pat. No. 3,129,029 issued to Ruzza on Apr. 14, 1964 and which includes a fixed jaw attached to a top handle while a pivotal lower handle is unitary with a movable jaw. Unlike the instant invention, the fixed jaw of this prior patent is joined to the top handle section by a longitudinal screed section that fully abuts the top surface of the brick so as to serve as a screed during buttering of the brick with mortar. This disallows the variable positioning of the tool and its jaws as permissible with the instant tool in order to accommodate either tiles, stones or bricks of variable thicknesses with the present straight jaw members which extend upwardly to the respective ends of the two handle sections.

U.S. Pat. No. 3,820,837 issued Jun. 28, 1974 to Fredrickson shows a battery carrier and employs an uppermost handle to which is pivotally attached a lower handle, with each handle terminating in a pivotal clutch or jaw. This tool appears to rely upon the rim projecting outwardly adjacent the top of a battery as the two clutches are closed together beneath this rim. Prior to applying this carrier to a battery, using only the top handle, gravity would collapse the two jaw assemblies together. This is unlike the instant tool wherein lifting only the top handle insures opening of the jaws due to the mass of the lower, pivotal handle so that the tool is immediately ready for use, starting by lowering the fixed rear jaw after which the lower handle is manipulated to achieve the correct spacing for insertion of the pivotal, front jaw.

Another battery lifting tool is shown in U.S. Pat. No. 4,055,364 issued Oct. 25, 1977 to Breite and wherein a single handle affixed to a pivotal jaw is adjustably positionable along a horizontal member attached to a second jaw. This is in contrast to the present tool which does not rely upon any member resting atop the lifted article since such an arrangement would preclude the use of a pivotal handle below the top handle and also would interfere with stones or tiles having irregular upper surfaces.

None of the above inventions or patents, considered either singly or in any combination, is seen to even remotely describe or suggest the unique structure of the tool as claimed herein.

SUMMARY OF THE INVENTION

By the present invention, an improved tool is provided and which is especially adapted for the lifting and replacement of block type elements from an array of similar adjacent block elements without disturbing those adjacent elements. A horizontal, top handle affixed to a vertical, straight rear jaw is adapted initially to be engaged with one edge of a block or the like while a pivotal, straight front jaw is precisely located by manipulation of a lower, substantially parallel pivotal handle in order to engage an opposite edge of the block in mind. Thereafter, clamping pressure between the two opposed jaws is accurately controlled by a squeezing action between the two handles and when this pressure is as desired then, the block is lifted by a combined raising of the two handles during which greater or lesser clamping pressure upon the block may be achieved by altering the squeezing action between the two handles, independently of the overall lift rate of the captured block member.

Square, rectangular or polygonal block elements may be readily removed and installed by employing jaw members comprising flat or straight lower tips adapted to clampingly engage opposed flats on respective rectangular blocks while alternatively, the jaw tips may be otherwise configured in a V-like formation to engage the apices between two angularly adjacent planar surfaces of a polygonal block or, curved in an arcuate formation to mate with the periphery of circular blocks.

Accordingly, one of the objects of the present invention is to provide an improved block handling tool including a top handle joined to a fixed depending jaw to which is pivotally attached a channel-shaped lower handle affixed to a second, opposed depending jaw.

Another object of the present invention is to provide an improved block handling tool including a horizontal top handle of inverted U-shape in cross-section having at one end a rear jaw normal thereto with the other end carrying a pivot fastener supporting the front end of a U-shaped lower handle from which depends in normal fashion, a front jaw, with both jaws having a lower tip disposed a substantial distance beneath the two handles when in parallel disposition.

A further object of the present invention is to provide an improved block handling tool including a top handle provided with a rear jaw affixed thereto and having a front end pivotally supporting the forward end of a lower handle having a front jaw affixed thereto and wherein the lower handle includes a trailing end juxtaposed the rear jaw to provide a mass sufficient to normally swing the front jaw away from the rear jaw upon raising the top handle.

Still another object of the present invention is to provide an improved block handling tool including dual normally parallel, horizontal handles respectively having depending jaws disposed normal to the handles with the lower tips of the jaws provided with opposed substantially planar gripping surfaces or alternatively, opposed V-shaped or arcuate gripping surfaces.

Still another object of the present invention is to provide an improved block handling tool wherein the lower tips of the jaws, be they planar, V-shaped, or arcuate, are heat treated to increase their hardness, rigidity, and wear properties.

Another object of the present invention is to provide an improved block handling tool including two handles respectively integral with a depending jaw and pivotally joined by a fastener adjacent the distal end of one handle and engaging the other handle adjacent its respective affixed jaw.

With these and other objects in view which will more readily appear as the nature of the invention is better understood, the invention consists of the novel construction, combination and arrangement of parts hereinafter more fully described, illustrated and claimed.

BRIEF DESCRIPTION OF THE DRAWINGS

Preferred and practical embodiments of the invention are shown in the accompanying drawings, in which:

FIG. 2 is a side elevation of the tool shown in FIG. 1 as it is being lowered to extract a block;

FIG. 3 is a view similar to FIG. 2, showing the relative position of the two handles and jaws as a block is being grasped;

Similar reference characters designate corresponding parts throughout the several figures of the drawing.

DESCRIPTION OF THE PREFERRED EMBODIMENTS

Figure 1:
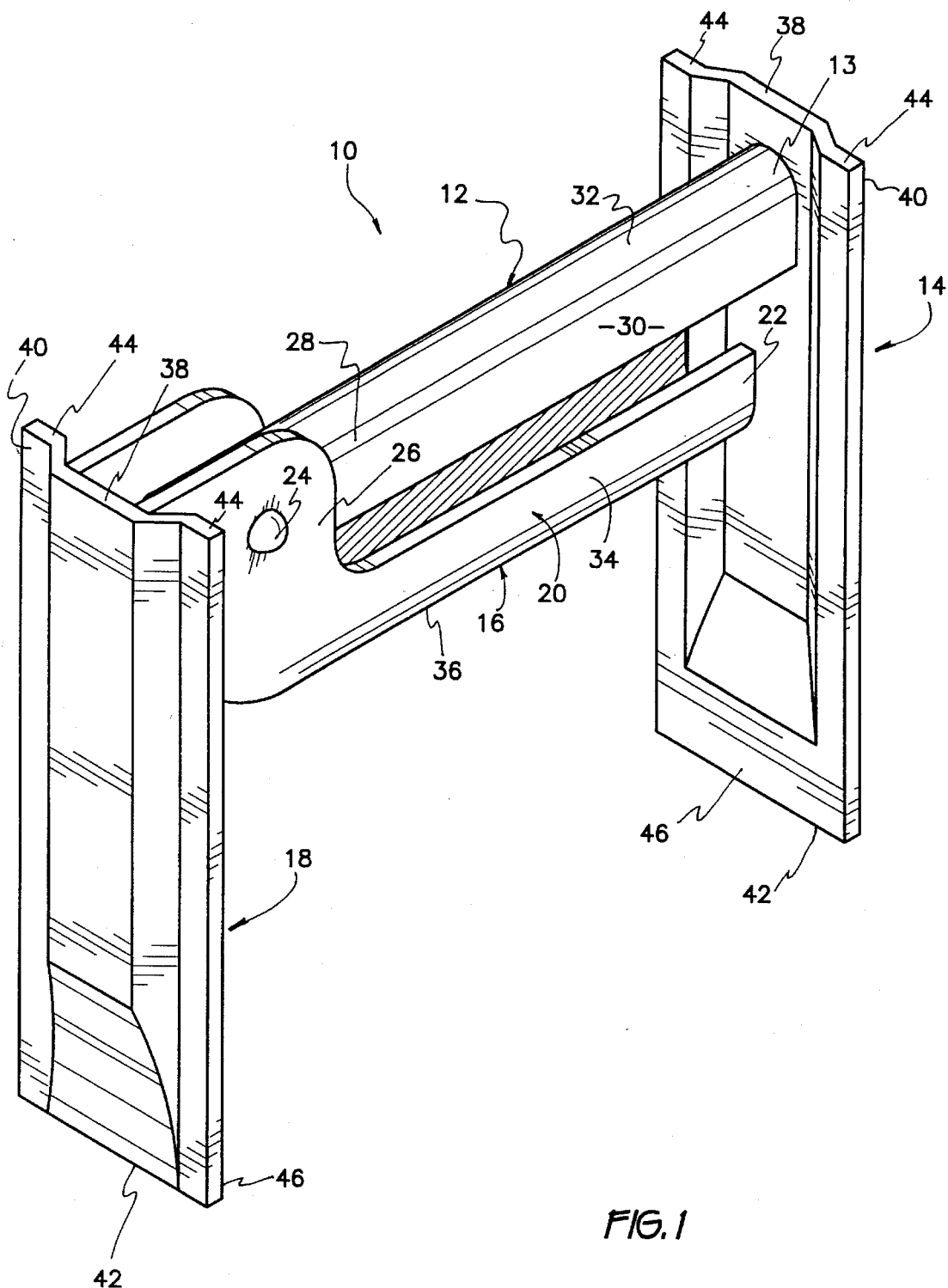
FIG. 1 is a side perspective view of the tool of the present invention as it appears in an at-rest position.
Figure 4:
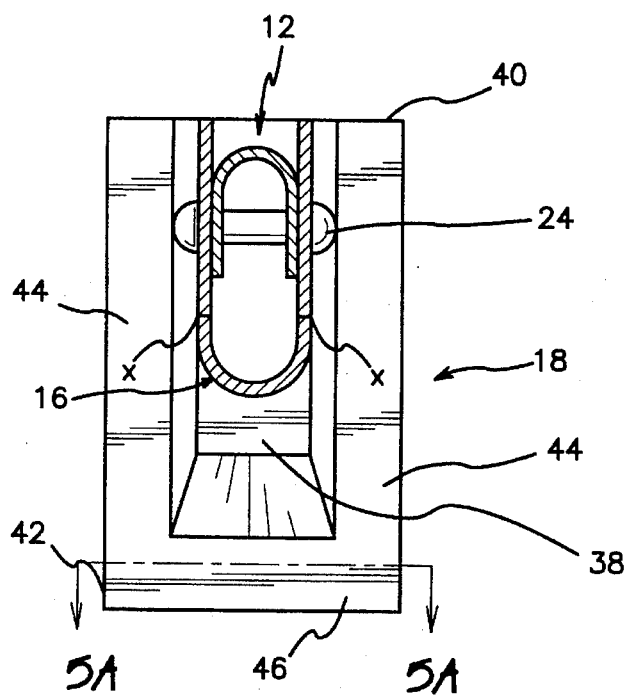
FIG. 4 is a transverse cross-sectional view taken along the line 4—4 of FIG. 2.

Referring now to the drawings, particularly FIG. 1, the present invention comprises a compact, simply constructed tool generally designated 10 and will be seen to include but three separate unitary components. One, a fixed upper or top handle 12 includes a trailing end 13 attached to a rear jaw 14 and presents a normally horizontally disposed or fixed handle normal to the vertically disposed rear jaw. This component cooperates with a displaceable bottom or lower handle 16 likewise fixedly connected to a front jaw 18. With the tool 10 disposed in its normal at-rest condition, the finger grip section 20 of the lower handle 16, which comprises the majority of the extent of this handle, is aligned generally parallel to the top handle 12 and includes a distal trailing end 22 located juxtaposed the vertical rear jaw 14. The preferred attachment of the two jaws to the respective handles is by welding (not shown). It is also contemplated that a removable fastening means could be used to facilitate the ease with which the jaw tips may be changed. The third component comprises a transverse fastener 24 pivotally attaching the forward end 26 of the lower handle 16 to the front or distal portion 28 of the top handle 12. Although not shown, it is contemplated that an improved top handle 12 may have its front portion 28 adjustable lengthwise with respect to its rear portion 13. This would allow for handling bricks and tiles of various sizes with a single tool.

For maximum strength and ease of manufacture, both of the handles 12,16 are preferably formed with a channel or U-shaped cross-section. The top handle 12 will be seen to be formed as an inverted U-channel with vertical side walls or flanges 30—30 joined to a preferably curved top wall 32. On the other hand, the lower handle 16 is formed of U-channel stock having side walls 34—34 joined to a preferably curved bottom wall 36. In this manner, a natural, most comfortable grip is experienced as a user grasps the tool 10 with the curved top wall 32 of the top handle nested within the palm of the hand between the thumb and index finger while the inner portions of the fingers are wrapped about the curved bottom wall 36 of the lower handle 16. Accordingly, it is seen that the upper handle 12 side walls 30—30 are nested or sandwiched between the two side walls 34—34 of the lower handle 16.

The enlarged flanges formed by the lower handle side walls 34—34 in the area of the forward portion 26 provide increased reinforcement for the manipulation of the front jaw 18 as well as for the attachment of the transversely extending pivotal fastener 24. This fastener is shown as a double headed rivet but obviously may comprise any suitable elongated pin type fastener. The two jaws 14,18 may define identical configurations for simplicity of manufacture and will be seen to include a central rib or deformation 38 providing longitudinal rigidity extending from each jaw top end 40 to a point just short of the lower, grasping end 42. Each rib 38 is bounded by flat flanges 44—44 which in the embodiment of FIG. 1 extend the full height of the jaws. In this form of the invention, the bottom of the jaws will be seen to form a transversely extending planar grasping end 46 most suitable for handling block elements provided with opposite, straight, parallel edges as will be described hereinafter.

To utilize the tool 10 as related above, it will be appreciated that the jaws of the tool when in the position of FIGS. 1 and 2 should define a space between their grasping ends 46—46 approximately the same as or slightly greater than the distance between two opposite flat faces or edges of the block element to be handled. With installations wherein a grout or mortar was employed between adjacent block elements, any suitable scraper tool initially will be used to remove such material surrounding the damaged block to be removed. Thereafter, the tool 10 is picked up by grasping the upper handle 12 between the thumb and index finger with the fingers reaching down to manipulate the lower handle 16. In this manner it will be understood that the finger tips may readily operate the lower handle either upwardly or downwardly to angularly offset the disposition of the front jaw 18 relative the rear jaw 14 so as to insure that the distance between the two jaw grasping ends 46—46 is sufficient to clear the span of the block element being operated upon. Then, by lowering the entire tool 10, the two lower grasping ends 46—46 are urged downwardly beside the two opposite surfaces or lateral edges of the block periphery. Thereafter, the user applies an upward force upon the lower handle 16 while maintaining the upper handle 12 relatively stationary and this action produces a clamping force between the two jaws against the opposite faces of the block as in FIG. 3. When thusly engaged, the block is firmly clamped by the tool and may be lifted upwardly to remove it from its prior installation. In the use position of FIG. 3, the trailing end 22 of the lower handle 16 is shown deflected to a position adjacent the lower edge of the upper handle 12. This is not necessarily the limit of the lower handle displacement as it will be recalled that the lower handle 16 comprises a U-shaped configuration with the upper handle 12 sandwiched therewithin. Accordingly, the lower handle may be displaced still more should it become necessary to increase the clamping force called for. Precise installation of a replacement block is readily achieved merely by reversing the foregoing sequence. It should be noted that the structure of the present invention is such that after the block is gripped, the weight of the block will also help maintain the grasping force if the user merely lets the lower handle rest in their hand.

As the trailing end 22 of the lower handle 16 will be seen to extend to a point just short of the rear jaw 14 while the pivot point of the fastener 24 is located in close proximity to the front jaw 18, it will be appreciated that the sufficient mass of the lower handle will encourage the finger grip section 20 of the lower handle 16 to normally remain spaced from the upper handle 12. This facilitates the initial grasping of the tool 10 to enable the user's fingers to engage and control the displacement of the lower handle relative the upper handle.

Figure 5A:
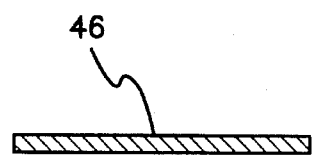
FIG. 5A is a sectional view of one form of jaw lower grasping end, taken along the line 5A—5A of FIG. 4.
Figure 5B:
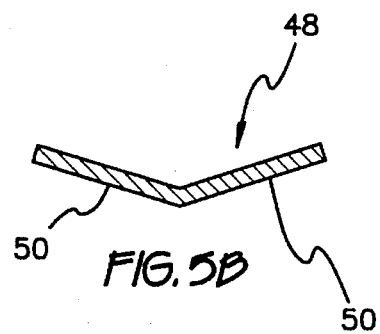
FIGS. 5B–5C are sectional views of further embodiments of the jaw lower grasping ends.

FIG. 5B depicts an alternative jaw lower grasping end 48 comprising a generally V-shaped configuration including a pair of angularly offset portions 50—50 and which may be used to facilitate the removal and replacement of polygonal block elements. The included angle between the two offset portions 50—50 may be formed to accommodate block elements having any number of sides. For example, a sixty degree angle would be most appropriate when handling hexagonal blocks.

Figure 5C:
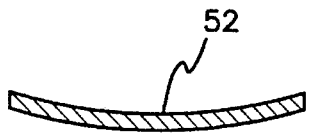

Circular blocks are quite popular for patio and garden walkways and in this regard the jaw lower grasping end 52 shown in FIG. 5C is most convenient. This configuration comprises a curved or arcuate shape constructed with a radius similar to that of the blocks being addressed. Using a tool 10 having this type of jaw ends, the circular block may be grasped at any two opposite points about its periphery.

From the foregoing description, one skilled in the art can easily ascertain the essential characteristics of this invention and, without departing from the spirit and scope thereof, can make various changes and modifications of the invention to adapt it to various other usages and conditions.

It is to be understood that the present invention is not limited to the sole embodiments described above but encompasses any and all embodiments within the scope of the appended claims.

I claim:

1. A lifting tool for patio block elements which is specifically designed for lifting a single block from within an array of pre-existing blocks, each block having a lateral periphery presenting opposite surfaces comprising;

a horizontal upper handle having opposite trailing and free distal ends, a rear jaw fixedly attached to said upper handle trailing end, a lower handle having a forward end joined to a finger grip section disposed beneath said upper handle and terminating in a distal trailing end, said lower handle forward end including a pair of laterally spaced apart side walls and where said upper handle distal end is sandwiched between said laterally spaced apart side walls of said lower handle, a front jaw fixedly attached to said lower handle forward end, where said front and said rear jaws include an upper end and an opposite lower grasping end, both said front jaw grasping end and said rear jaw grasping end being a substantially continuous thin surface perpendicular to said lower handle and said upper handle, respectively, and each of said jaws including a central reinforcing rib, including an inner recessed portion and an outer deformation, extending from said jaws upper ends to a point proximate said jaws lower grasping ends, wherein said thin surface of said grasping ends is narrow enough to be easily placed in preexisting gaps between the blocks in the array of blocks so as to be able to lift out a single one of the blocks without disturbing surrounding blocks;

said front and rear jaws disposed normal to said lower handle finger grip section and said upper handle respectively, a fastener pivotally connecting said lower handle forward end to said upper handle adjacent said upper handle distal end with said front jaw juxtaposed said upper handle distal end, and both said jaws having integral lower grasping ends adapted to flushly engage only opposite vertical surfaces of the lateral periphery of a block element, whereby upon grasping said upper handle with one's hand said tool is elevated while one's finger tips engage said lower handle to manipulate said lower handle finger grip section with a corresponding angular displacement of said front jaw relative said rear jaw to regulate the gripping action between said lower grasping ends of said jaws and the lifting action on said lower handle enhances the gripping action between opposite smooth sides of said block.

2. A block lifting tool according to claim 1, wherein said front and rear jaw grasping surfaces define a pair of laterally disposed and angularly offset vertical planer surfaces.

3. A block lifting tool according to claim 2 wherein the angle defined is 120°.

4. A block lifting tool according to claim 1, wherein said front and rear end grasping surfaces each define a substantially vertically disposed arcuate section, both of said sections defining a portion of a circle having a predetermined radius.

* * * * *